(12) United States Patent
Shibata et al.

(10) Patent No.: US 8,471,988 B2
(45) Date of Patent: Jun. 25, 2013

(54) ELECTRODE CONTACT STRUCTURE, LIQUID CRYSTAL DISPLAY APPARATUS INCLUDING SAME, AND METHOD FOR MANUFACTURING ELECTRODE CONTACT STRUCTURE

(75) Inventors: Satoshi Shibata, Osaka (JP); Hiroyuki Kamee, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 213 days.

(21) Appl. No.: 13/057,953

(22) PCT Filed: Jun. 26, 2009

(86) PCT No.: PCT/JP2009/061778
§ 371 (c)(1),
(2), (4) Date: Feb. 7, 2011

(87) PCT Pub. No.: WO2010/024035
PCT Pub. Date: Mar. 4, 2010

(65) Prior Publication Data
US 2011/0157526 A1    Jun. 30, 2011

(30) Foreign Application Priority Data

Aug. 27, 2008    (JP) .................................. 2008-218830

(51) Int. Cl.
*G02F 1/1333*    (2006.01)
(52) U.S. Cl.
USPC .......................................................... 349/122
(58) Field of Classification Search
USPC .......................................................... 349/122
See application file for complete search history.

(56) References Cited

U.S. PATENT DOCUMENTS

| | | | |
|---|---|---|---|
| 5,354,513 A * | 10/1994 | Nakamura et al. | ............. 252/585 |
| 5,666,223 A * | 9/1997 | Bennett et al. | ........... 359/487.04 |
| 6,942,925 B1 | 9/2005 | Lazarev | |
| 2003/0118754 A1* | 6/2003 | Gamble et al. | ............... 428/1.31 |
| 2004/0027510 A1 | 2/2004 | Iijima | |
| 2006/0082706 A1 | 4/2006 | Choo et al. | |
| 2006/0125986 A1 | 6/2006 | Choo et al. | |
| 2007/0085112 A1 | 4/2007 | Yamazaki | |
| 2007/0103613 A1 | 5/2007 | Song | |
| 2007/0158651 A1* | 7/2007 | Song et al. | ...................... 257/59 |
| 2007/0188686 A1* | 8/2007 | Yano et al. | .................... 349/119 |

FOREIGN PATENT DOCUMENTS

| | | |
|---|---|---|
| CN | 1652296 A | 8/2005 |
| CN | 1763615 A | 4/2006 |
| CN | 1790113 A | 6/2006 |
| JP | 2005-210083 | 8/2005 |
| JP | 3765284 | 2/2006 |
| JP | 2007-114792 | 5/2007 |
| WO | 99/08140 | 2/1999 |

OTHER PUBLICATIONS

International Search Report for PCT/JP2009/061778, mailed Aug. 4, 2009.

* cited by examiner

*Primary Examiner* — Timothy L Rude
(74) *Attorney, Agent, or Firm* — Nixon & Vanderhye, P.C.

(57) ABSTRACT

A water-repellent pattern (26) made from a water-repellent material is provided around a contact hole (20), and causes a polarizing layer (24) made from a water-soluble material to be separated from the contact hole (20). It is therefore possible to provide (i) an electrode contact structure which can prevent a reduction in mass productivity, (ii) a liquid crystal display apparatus in which the electrode contact structure is provided, and (iii) a method for manufacturing the electrode contact structure.

12 Claims, 10 Drawing Sheets

(a)

(b)

(c)

(d)

ELECTRODE CONTACT STRUCTURE, LIQUID CRYSTAL DISPLAY APPARATUS INCLUDING SAME, AND METHOD FOR MANUFACTURING ELECTRODE CONTACT STRUCTURE

This application is the U.S. national phase of International Application No. PCT/JP2009/061778, filed 26 Jun. 2009, which designated the U.S. and claims priority to Japanese Patent Application No. 2008-218830, filed 27 Aug. 2008, the entire contents of each of which are hereby incorporated by reference.

TECHNICAL FIELD

The present invention relates to (i) an electrode contact structure having a contact hole via which electrodes provided above and below a layer including a water-soluble layer are electrically connected to each other, (ii) a liquid crystal apparatus in which the electrode contact structure is provided, and (iii) a method for manufacturing the electrode contact structure.

BACKGROUND ART

A variety of types of liquid crystal display apparatuses have been developed so as to realize an advanced function and less power consumption. An example of liquid crystal display apparatuses which is currently put in practical use encompasses a liquid crystal display apparatuses in which a reflective region and a transmissive region are provided in each pixel. The reflective region of the pixel is a region where external light, such as natural light or illumination light, is reflected, whereas the transmissive region of the pixel is a region where light coming from a backlight is passed through. In this type of the liquid crystal display apparatus, a display mode is switched to a reflective display mode in a bright environment and is switched to in transmissive display mode in a dark environment. In the reflective display mode, the liquid crystal display apparatus uses light reflected by the reflective region so as to display an image or a moving image. On the other hand, in the transmissive display mode, the liquid crystal display apparatus uses light coming from the backlight so as to display an image or a moving image. Since the liquid crystal display apparatus uses the light coming from the backlight only in the dark environment, the backlight can achieve a reduction in power consumption.

Patent literature 1 discloses a technique which improves a transmissive mode in terms of a use efficiency of light by providing, in a reflective region of a pixel, a polarizing layer for changing a polarization direction. With reference to (a) through (d) of FIG. 10, the following description discusses a method for providing the polarizing layer in the reflection region of the pixel. (a) through (d) of FIG. 10 are views showing a method for manufacturing a conventional liquid crystal display apparatus.

As shown in (a) of FIG. 10, a reflection layer 110 is patterned on a substrate. Then, as shown in (b) of FIG. 10, a water-repellent resin 111 is provided in the pattern thus formed in the reflection layer 110. After this, a water-soluble material is applied to the reflection layer 110 and the water-repellent resin 111, with the result that the water-soluble material applied to the water-repellent resin 111 is repelled, whereas the water-soluble material applied to the reflection layer 110 is fixed thereon to constitute a polarizing layer 112 (see (c) of FIG. 10). Then, as shown in (d) of FIG. 10, a protection layer 113 is deposited on the water-repellent resin 111 and the polarizing layer 112.

An example of the material of the polarizing layer 112 is disclosed in Patent literature 2.

CITATION LIST

Patent Literature 1

Japanese Patent No. 3765284 A (Publication Date: Apr. 12, 2006)

Patent Literature 2

International Publication No. WO9908140 (Publication Date: Feb. 18, 1999)

SUMMARY OF INVENTION

Technical Problem

There has also been a widely known technique which realizes improved response speed, higher luminance, higher image quality, and the like, by providing, in a pixel, a driving device such as a thin film transistor (TFT) device. In the technique, (i) the TFT device is provided on a glass substrate, and (ii) a drain electrode of the TFT device is electrically connected to a pixel electrode made from a material such as ITO, via a hole (contact hole) for securing a contact.

A liquid crystal display apparatus disclosed in Patent Literature 1 has a drawback that a TFT device and a pixel electrode are not electrically connected to each other. This is because Patent Literature 1 pays no attention to the electrical connection of the TFT device and the pixel electrode. However, such contact structure must be provided especially in a liquid crystal panel of SHA (Super High Aperture) type, if a manufacturing process of the liquid crystal panel includes patterning a polarizing layer having been provided in a pixel.

A normal photolithography step includes carrying out alkali development in which an alkali solution is used for a developer. However, there is a case that a layer to be patterned includes a layer made from a water-soluble material. If the alkali development is carried out to such layer, it is impossible to carry out accurate patterning and, furthermore, there is a risk that the water-soluble material is exfoliated. This is described with reference to (a) through (e) of FIG. 11.

As shown in (a) of FIG. 11, a water-soluble layer 121 is provided, as a polarizing layer, on a substrate 120. Then, as shown in (b) of FIG. 11, a protection layer 122 made from a material such as acrylic is deposited on the water-soluble layer 121. After this, alkali development is carried out those parts of the water-soluble layer 121 and the protection layer 122 which are provided in a region where a contact hole is to be formed. This causes the respective parts of the water-soluble layer 121 and the protection layer 122 to be removed, as shown in (c) of FIG. 11. Thus, a contact hole 130 is formed.

The process above, however, has a drawback described as follows. The water-soluble layer 121 is exposed to the alkali solution used in the alkali development. As shown in (d) of FIG. 11, after the contact hole 130 is formed, the alkali solution gradually percolates from an exposed part of the water-soluble layer 121 into an inner part of the water-soluble layer 121. A part of the water-soluble layer 121 which has been wet by the alkali solution is all etched. If the alkali solution further percolates, the water-soluble layer 121 is exfoliated, with the result that the protection layer 122 deposited on the water-soluble layer 121 is removed as well (see (e) of FIG. 11).

In a case where the developer is an organic solvent instead of being the alkali solution, it is possible to prevent the developer from percolating into a polarizing layer 102. Such organic solvent development, however, has a drawback that a mass productivity is lowered as compared to a case in which the polarizing layer 102 is patterned by the alkali development.

The present invention is made in view of the problem, and an object of the present invention is to provide (i) an electrode contact structure which can prevent a reduction in mass productivity, (ii) a liquid crystal display apparatus in which the electrode contact structure is provided, and (iii method for manufacturing the electrode contact structure.

Solution to Problem

In order to attain the object, an electrode contact structure of the present invention includes: a first electrode that is provided above a substrate; an intermediate layer that is provided above the first electrode and that includes a water-soluble layer made from a water-soluble material; a second electrode that is provided on the intermediate layer and that is connected to the first electrode via a contact hole in the intermediate layer; and a water-repellent pattern, made from a water-repellent material, which is provided around the contact hole so that the contact hole is separated from the water-soluble layer.

In the configuration, the water-repellent pattern made from the water-repellent material is provided around the contact hole, and causes the water-soluble layer of the intermediate layer to be separated from the contact hole. Thus, the water-soluble layer is prevented from being exposed to the alkali developer for use in the photolithography process by which the contact hole is patterned. This brings about an effect that even in a case where the contact hole is subjected, in a normal photolithography step, to development using an alkali solution (alkali development), it is possible to prevent (i) the alkali solution from percolating into the water-soluble layer and (ii) the water-soluble layer from being exfoliating die to the percolating.

With the present invention, it is therefore possible to provide an electrode structure subjected to highly-accurate patterning, even in a case where the alkali development is carried out for the patterning of the contact hole and the intermediate layer such as the polarizing layer provided around the contact hole.

In the present invention, furthermore, the contact hole can be formed by the alkali development. Therefore, it is further to prevent a reduction in mass productivity, as compared to a case in which the contract hole is formed by development employing an organic solvent (organic solvent development).

In the configuration, as described above, it is possible to pattern the contact hole by the alkali development even in a case where the intermediate layer includes the water-soluble layer made from the water-soluble material. This brings about an effect that realizes an electrode contact structure which prevents a reduction in mass productivity, as compared to the case in which the contact hole is formed by the organic solvent development.

It is preferable that the electrode contact structure of the present invention be configured so that the water-repellent pattern has an inner side surface which is an inner wall of the contact hole, the inner side surface of the water-repellent pattern being so that the contact hole has a taper shape in which an inner diameter of the contact hole is increased from a bottom surface of the contact hole to an opening of the contact hole.

In the configuration, the inner side surface of the water-repellent pattern and a bottom of the contact hole make an angle greater than 90°. In a case where the angle is less than 90°, i.e., in a case where the contact hole has a so-called reversed taper shape, it is difficult that the second electrode be provided so as to cover the inner side surface of the water-repellent pattern and the bottom of the contact hole continuously.

In the configuration, it is ensured that the second electrode covers the inner side surface of the water-repellent pattern and the bottom of the contact hole continuously. This brings about an effect that prevents the second electrode from being disconnected in the contact hole.

It is preferable that the electrode contact structure of the present invention be configured so that the inner side surface is at an angle of approximately 45° with the first electrode.

Note that the smaller area the water-repellent pattern occupies, the more advantageous is brought about in terms of realization of a more minute electrode contact structure. In order to make smaller the area occupied by the water-repellent pattern, it is preferable that the inner side surface of the water-repellent pattern be inclined at an angle closer to 90°. However, such an angle closer to 90° causes an increase in risk that the second electrode is disconnected in the contact hole.

In consideration, it should be configured so that the taper shape has the angle of inclination of approximately 45°. This makes it possible to optimize a trade-off relationship between a size of the area occupied by the water-repellent pattern and the risk that the second electrode is broken in the contact hole.

It is preferable that the electrode contact structure of the present invention be configured so that the water-repellent pattern is provided so as to be in contact with the first electrode.

In the configuration, the intermediate layer, which is located between the first electrode and the second electrode, has an inner surface side which is an inner wall of the contact hole and which is covered by the water-repellent pattern. As such, the inner side surface of the intermediate layer is protected by the water-repellent pattern. This brings about an effect that prevents the inner side surface of the intermediate layer from being etched to have the reversed taper shape.

It is therefore possible to prevent, with higher certainty, the second electrode from being disconnected.

It is preferable that the electrode contact structure of the present invention be configured so that the first electrode has its end in the contact hole.

There is a case that when the contact hole is being formed, (i) a part of the first electrode which is provided in the contact hole is etched, and (ii) a region where the water-repellent pattern and the first electrode are in contract with each other is eroded so as to have the reversed taper shape.

In the configuration, a film surface located below the first electrode is exposed within the contact hole. In a case where the film surface is made from a material, such as glass, which is hardly etched, a part at which the film surface located below the first electrode is in contact with the water-repellent pattern is not eroded so as to have a reversed taper shape. It is therefore more likely that the second electrode covers with certainty the film surface exposed in the contact hole and the end of the first electrode. This brings about an effect that further lowers a possibility that the second electrode is disconnected in the contact hole.

A liquid crystal display apparatus of the present invention includes: any of the electrode contact structures described above; a driving device for carrying out a drive control with respect to a pixel; and a pixel electrode via which a voltage is applied so that the pixel is driven, the first electrode being a drain electrode of the driving device, and the second electrode being the pixel electrode.

In the configuration, it is possible to pattern the contact hole by alkali development even in a case where the intermediate layer includes a water-soluble layer made from a water-soluble material. This brings about an effect that realizes a type of a liquid crystal display apparatus in which an intermediate layer having a variety of functions is provided between a driving device and a pixel electrode and in which (ii) an electrode contact structure prevents a reduction in mass productivity, as compared to a case in which the contact hole is patterned by organic solvent development.

It is preferable that the liquid crystal display apparatus of the present invention further include: a driving device substrate in which the driving device is provided in the pixel; a common substrate that faces the driving device substrate; a first polarizing plate that is provided on an outer side of the driving device substrate and that passes through light polarized in a first direction; and a second polarizing plate that is provided on an outer side of the common substrate and that passes through light polarized in a second direction perpendicular to the first direction, the water-soluble layer being a polarizing layer, and the polarizing layer and the first polarizing plate having their respective transmission axes extending in substantially identical directions.

In the configuration, polarized light that is polarized in a same direction as a direction of a transmission axis of the first polarizing plate enters the driving device substrate from an outside of the driving device substrate. Note, however, that there is a case that polarized light having entered a driving device substrate is deteriorated in polarization direction (i.e., depolarized) as it passes through the driving device substrate and the common substrate.

However, the configuration deals with this by providing the polarizing layer. Specifically, the polarizing layer receives depolarized light and allows only passage of given polarized light that is polarized in a direction not blocked by a transmission axis of the polarizing layer. That is, the polarizing layer can correct the depolarization of the polarized light passing through the driving device substrate. This brings about an effect that maintains orthogonal relationship between (i) the direction in which the polarized light to be incident on the second polarizing plate is polarized and (ii) a polarization direction of the second polarizing plate.

Thus, it is possible that in a case where pixels are driven so as to carry out dark display (off display), for example, the polarized light incident on the second polarizing plate be prevented from passing therethrough.

With the configuration, it is therefore possible to prevent a decrease in contrast.

It is preferable that the liquid crystal display apparatus of the present invention be configured so that the common substrate includes: a color filter that is provided so as to face the driving device substrate; and another polarizing layer that is provided so as to face and be closer to the driving device substrate than the color filter is, the another polarizing layer and the second polarizing plate having their respective transmission axes extending in substantially identical directions.

In the configuration, (i) the polarizing layer is provided in the driving device substrate, and (ii) another polarizing layer is provided in the common substrate so as to face and be closer to the driving device substrate. This makes it possible to correct depolarization of incoming light passing through the driving device substrate and depolarization of incoming light passing through the color filter. This brings about an effect that realizes a liquid crystal display apparatus including a four (4) polarizing plates structure in which a decrease in contrast is greatly prevented.

It is preferable that the liquid crystal display apparatus of the present invention be configured so that: the intermediate layer of the driving device substrate includes a color filter and the polarizing layer which are stacked in this order; the polarizing layer and the first polarizing plate have their respective transmission axes in substantially identical directions.

In the configuration, the polarizing layer, which is included in the electrode contact structure provided in the driving device substrate, can correct depolarization of polarized light having passed through the color filter. It is therefore possible to obtain an effect of greatly preventing a decrease in contrast, even in case of proving one (1) polarizing layer between the driving device substrate and the common substrate.

In the configuration, it is further possible to keep light transmittance and mass productivity at higher levels, as compared to a case of providing two (2) polarizing layers between the driving device substrate and the common substrate, i.e., a case of constituting the liquid crystal display panel of a four (4) polarizing plates type.

It is therefore possible to realize a liquid crystal display apparatus of a three (3) polarizing plates type which can obtain an effect of greatly preventing a contrast decrease at same time as obtaining an effect of preventing reductions in transmittance and mass productivity.

It is preferable that the liquid crystal display apparatus of the present invention be configured so that the water-soluble layer is a wave plate which causes a change in phase of light which passes through the wave plate.

In configuration, it is possible to incorporate a function of a viewing angle compensating film is provided between the driving device substrate and the common substrate. It is therefore possible to realize a liquid crystal display apparatus having a wide viewing angle.

A method of the present invention for manufacturing an electrode contact structure includes the steps of: (a) forming a first electrode above a substrate; (b) forming a water-repellent pattern around a region of the first electrode in which a contact hole is to be formed, the water-repellent pattern being made from a water-repellent material; (c) forming an intermediate layer above the first electrode formed above the substrate, the intermediate layer including a water-soluble layer that is made from a water-soluble material; (d) removing part of the intermediate layer which is formed in the region in which the contact hole is to be formed; and (e) forming a second electrode that is connected to the first electrode via the contact hole.

In the arrangement, it is possible that the water-repellent pattern be provided around the contact hole, and that the water-repellent pattern cause the water-soluble material to be separated from the contact hole. Thus, even in a case where the step (d) is carried out by alkali development, the water-soluble layer will never be exposed to an alkali solution.

In the arrangement, it is therefore possible to carry out the step (d) by the alkali development. This brings about an effect that provides a method for manufacturing an electrode contact structure which can prevent a reduction in mass productivity, as compared to a case in which the step (d) is carried out by organic solvent development.

It is preferable that the method of the present invention for manufacturing an electrode contact structure be arranged so that the step (d) includes an alkali development step.

In the arrangement, it is therefore possible to provide a method for manufacturing an electrode contact structure which can prevent a reduction in mass productivity, as compared to a case in which the step (d) includes organic solvent development.

Advantageous Effects of Invention

As discussed earlier, an electrode contact of the present invention is configured so that a water repellent pattern around a contact hole is formed, and the contact hole is formed apart from a water-soluble layer.

A method of the present invention for manufacturing an electrode contact structure includes the steps of: (a) forming a first electrode above a substrate; (b) forming a water-repellent pattern around a region of the first electrode in which a contact hole is to be formed, the water-repellent pattern being made from a water-repellent material; (c) forming an intermediate layer above the first electrode formed above the substrate, the intermediate layer including a water-soluble layer that is made from a water-soluble material; (d) removing part of the intermediate layer which is formed in the region in which the contact hole is to be formed; and (e) forming a second electrode that is connected to the first electrode via the contact hole.

It is therefore possible to provide: an electrode contact structure manufacturable at mass productivity prevented from being reduced; and a method for manufacturing the electrode contact structure.

Figure 4:
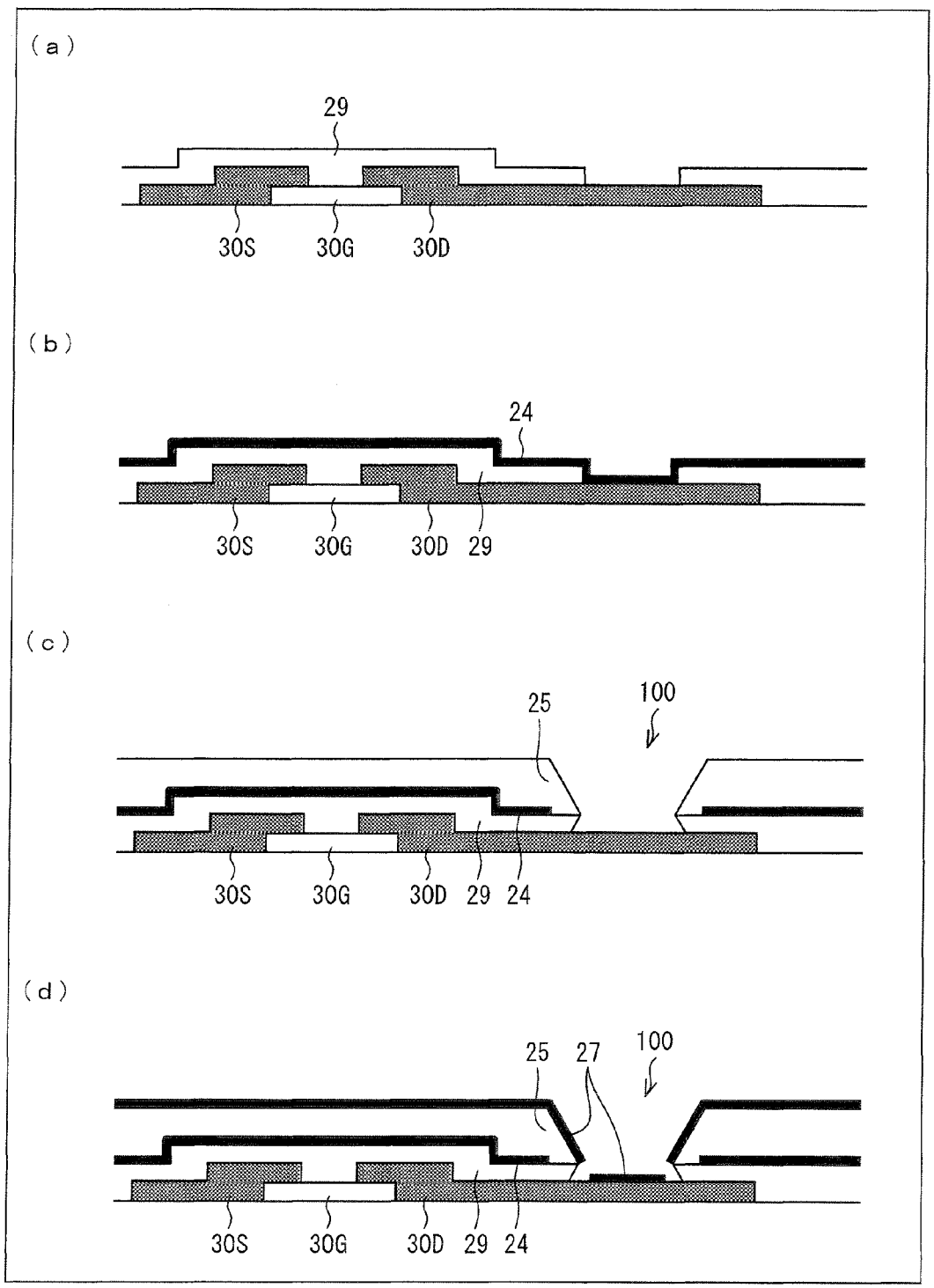

(a) of FIG. 4 is a cross sectional view showing how a TFT device and an insulating film are patterned. (b) of FIG. 4 is a cross sectional view showing how a polarizing layer is provided after the TFT and the insulating film have been patterned as shown in (a) of FIG. 4. (c) of FIG. 4 is a cross sectional view showing how an interlayer insulating film is provided so as to pattern a contact hole, after the polarizing layer has been formed as shown in (b) of FIG. 4. (d) of FIG. 4 is a cross sectional view showing how an ITO film is patterned after the interlayer insulating film has been provided as shown in (c) of FIG. 4.

Figure 5:
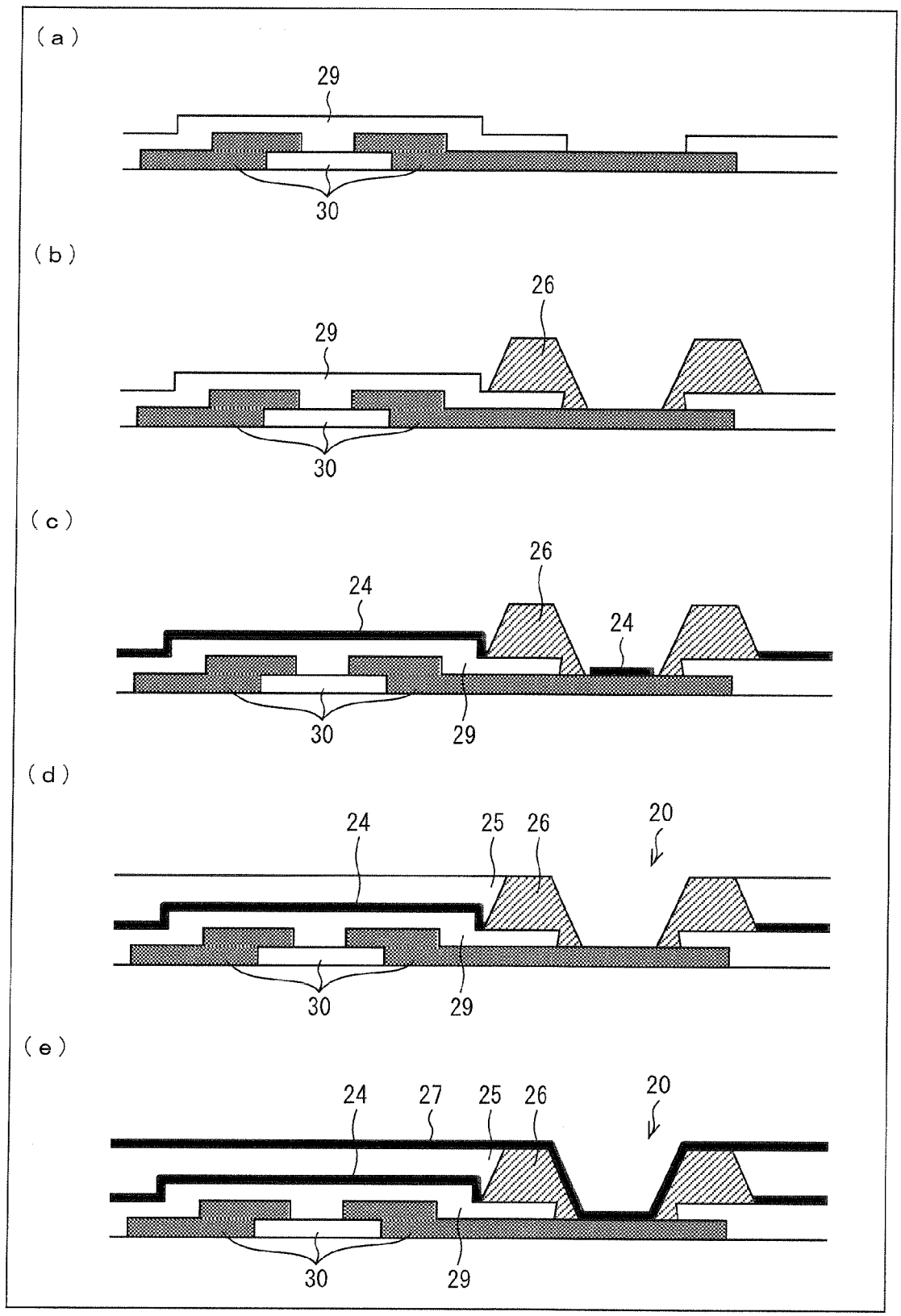

(a) of FIG. 5 is a cross sectional view showing how a TFT device and an insulating film are patterned. (b) of FIG. 5 is a cross sectional view showing how a water-repellent pattern is patterned around a region where a contact hole is to be formed, after the TFT device and the insulating film have been patterned as shown in (a) of FIG. 5. (c) of FIG. 5 is a cross sectional view showing how a polarizing layer is provided after the water-repellent pattern has been provided as shown in (b) of FIG. 5. (d) of FIG. 5 is a cross sectional view showing how an interlayer insulating film is provided so as to pattern a contact hole, after the polarizing layer has been formed as shown in (c) of FIG. 5. (e) of FIG. 5 is a cross sectional view showing how an ITO film is patterned after the interlayer insulating film has been provided as shown in (d) of FIG. 5.

Figure 6:
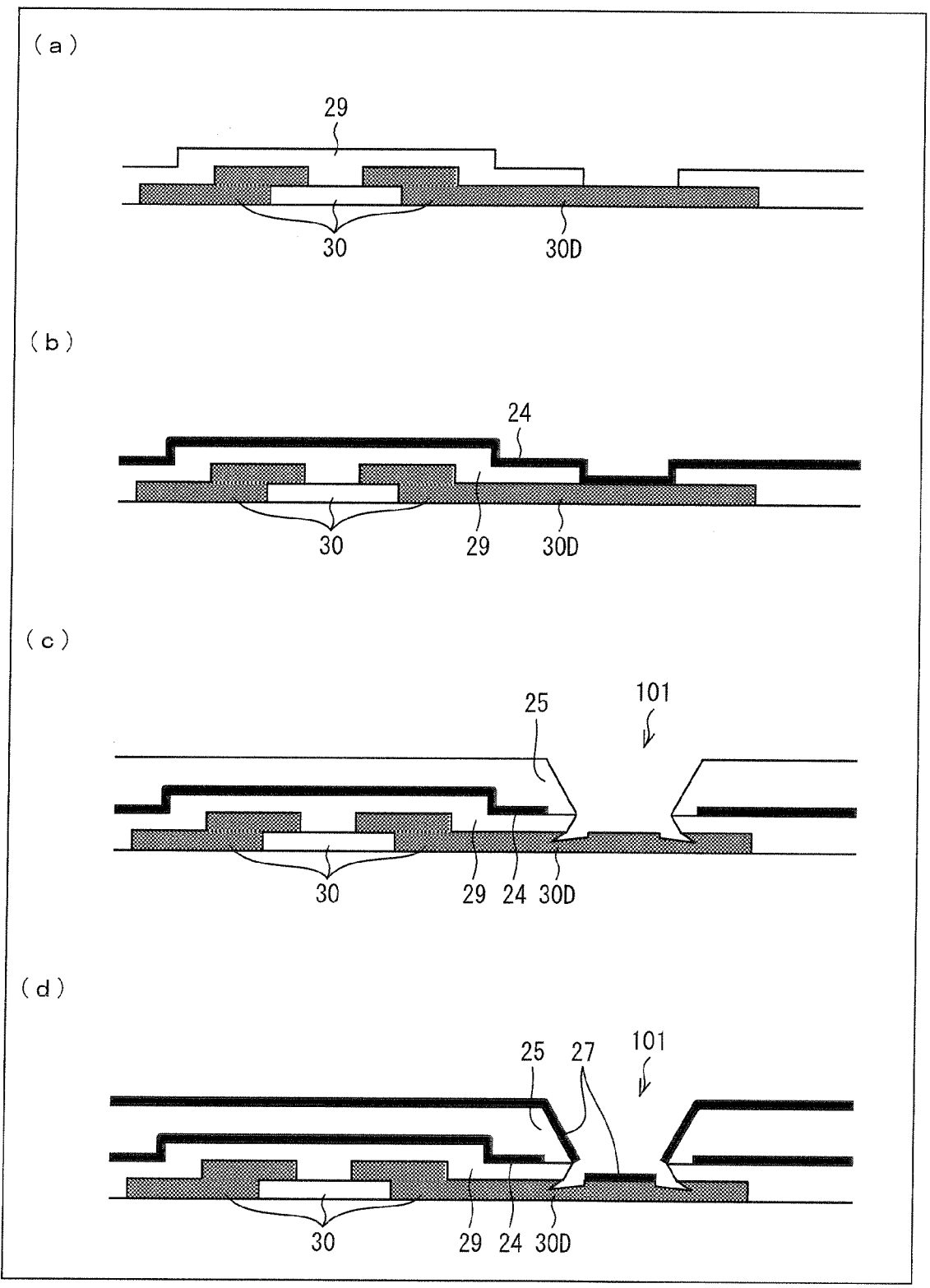

(a) of FIG. 6 is a cross sectional view showing how a TFT device and an insulating film are patterned. (b) of FIG. 6 is a cross sectional view showing how a polarizing layer is provided after the TFT and the insulating film have been patterned as shown in (a) of FIG. 6. (c) of FIG. 6 is a cross provided so as to pattern a contact hole, after the polarizing layer has been provided as shown in (b) FIG. 6. (d) of FIG. 6 is a cross sectional view showing how an ITO film is patterned after the interlayer insulating film has been provided as shown in (c) of FIG. 6.

Figure 7:
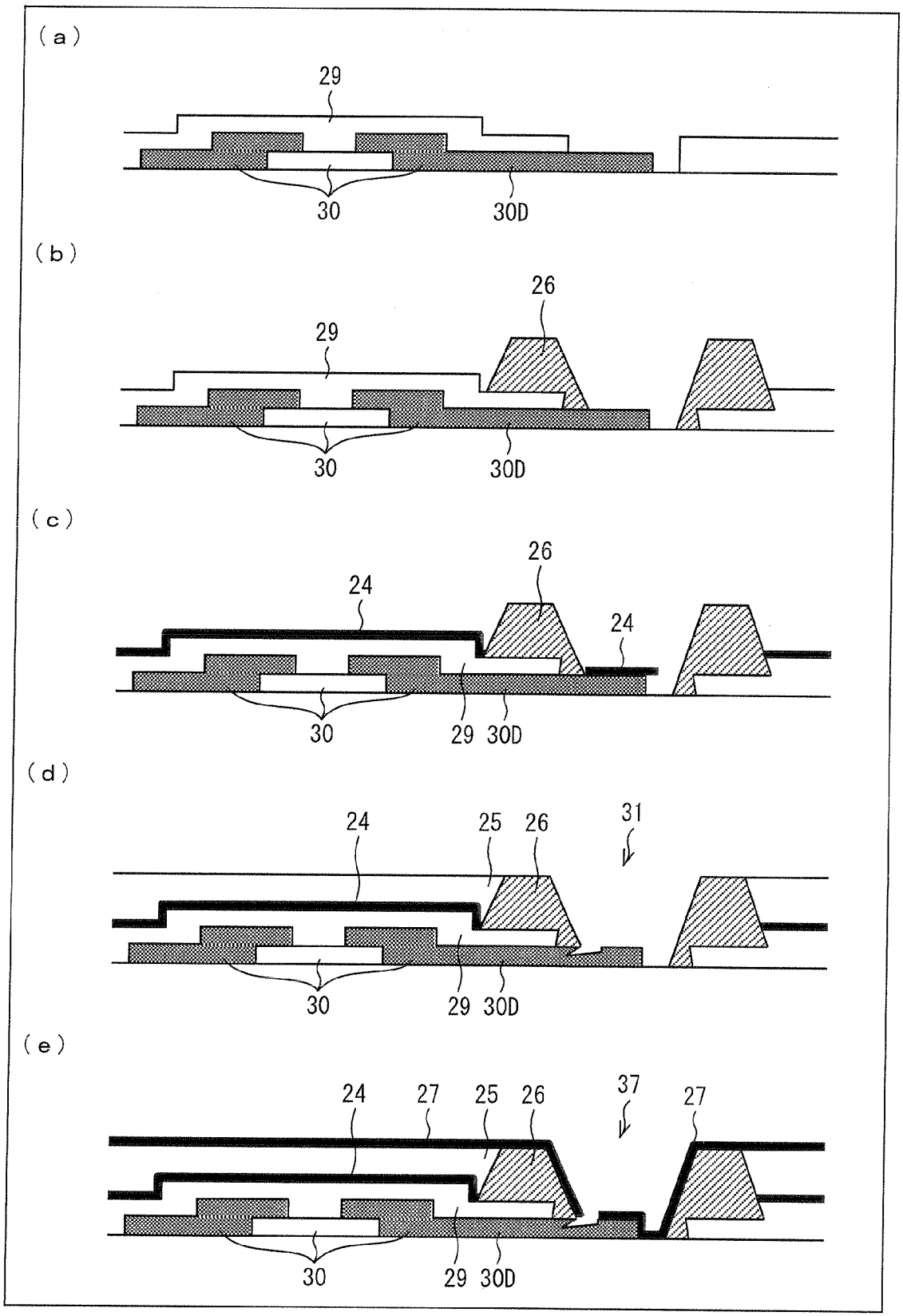

(a) of FIG. 7 is a cross sectional view showing how a TFT device and an insulating film are patterned. (b) of FIG. 7 is a cross sectional view showing how a water-repellent pattern is patterned around a region where a contact hole is to be formed, after the TFT device and the insulating film have been patterned as shown in (a) of FIG. 7. (c) of FIG. 7 is a cross sectional view showing how a polarizing film is provided after the water-repellent pattern has been provided as shown in (b) of FIG. 7. (d) of FIG. 7 is a cross sectional view showing how an interlayer insulating film is provided so as to pattern a contact hole, after the polarizing film has been provided as shown in (c) of FIG. 7. (e) of FIG. 7 is a cross sectional view showing how an ITO film is patterned after the interlayer insulating film has been provided as shown in (d) of FIG. 7.

Figure 8:
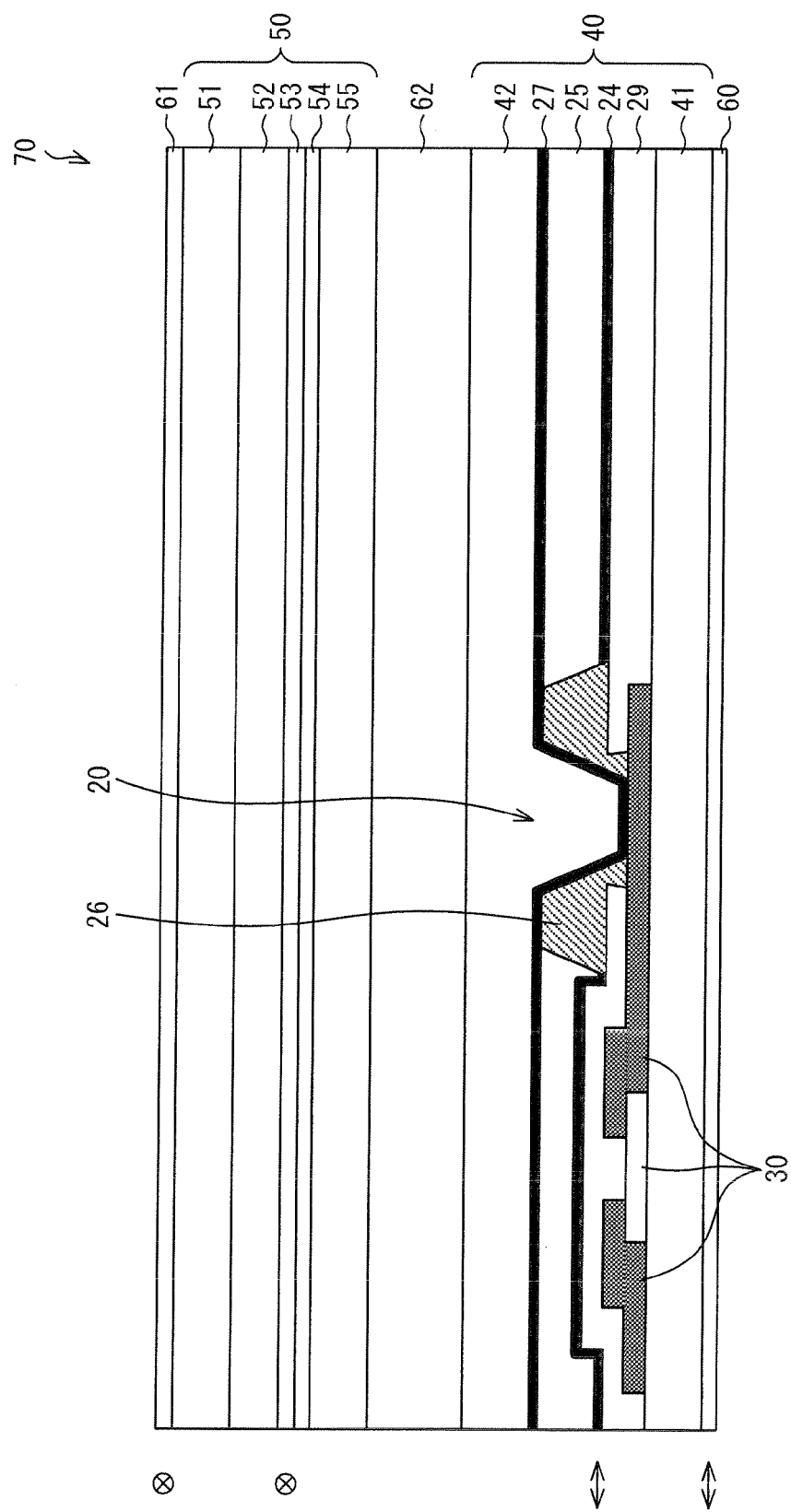

FIG. 8 is a cross sectional view showing a liquid crystal display apparatus in which the electrode contact structure is employed, in accordance with the one embodiment of the present invention.

Figure 9:
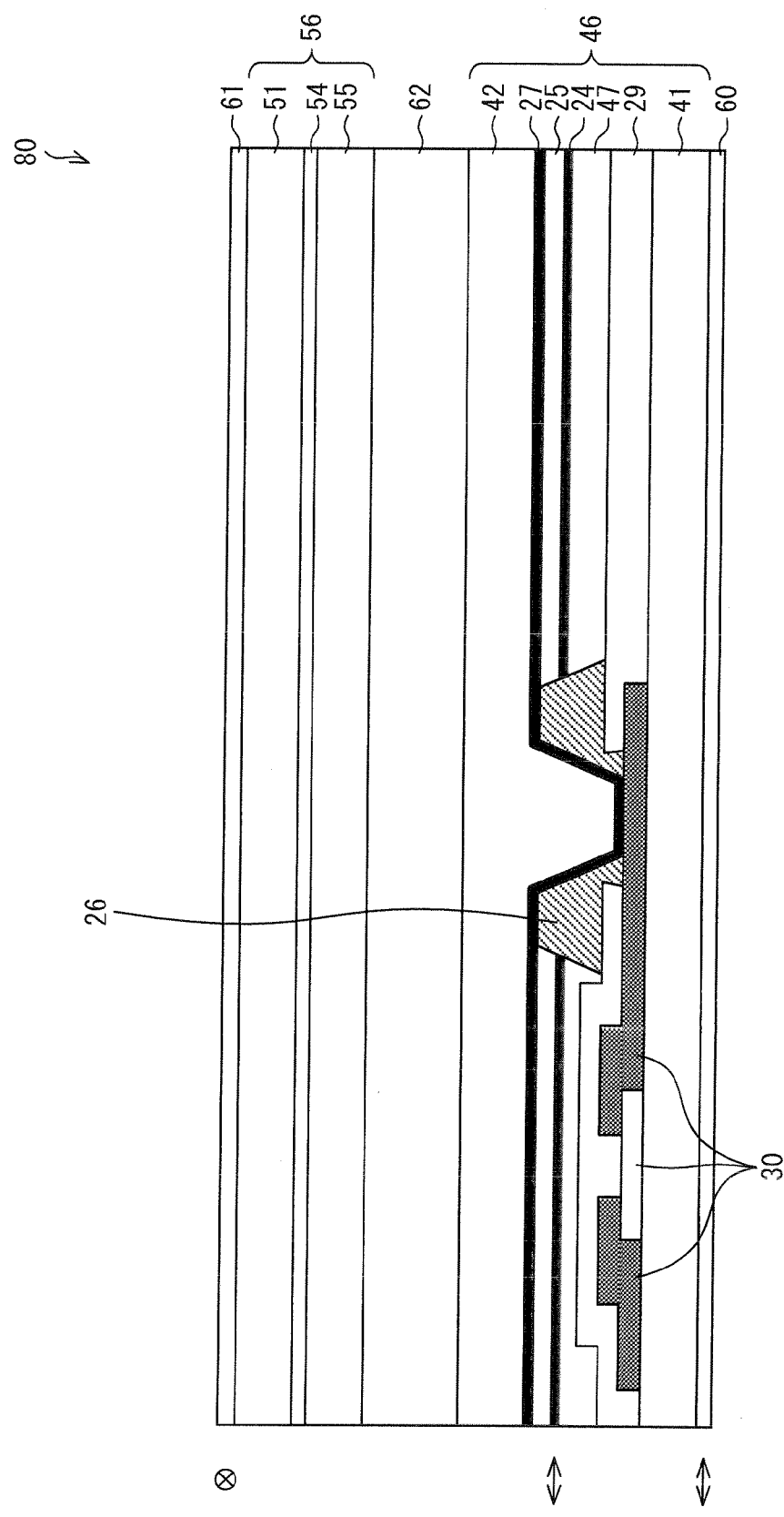

FIG. 9 is a cross sectional view showing a liquid crystal display panel in which the electrode contact structure is employed, in accordance with the one embodiment of the present invention.

Figure 10:
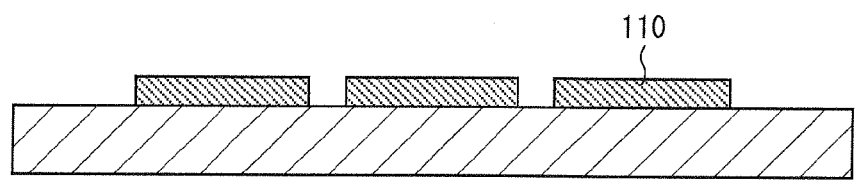
Figure 10:
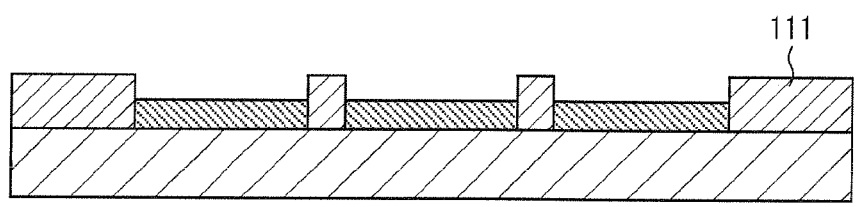
Figure 10:
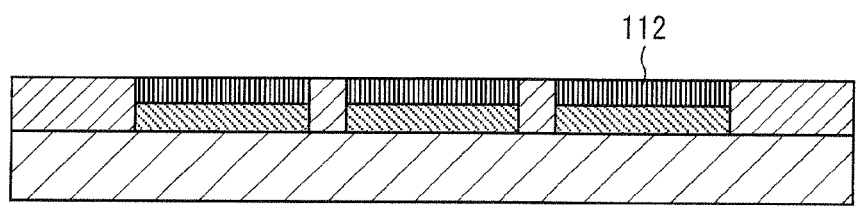
Figure 10:
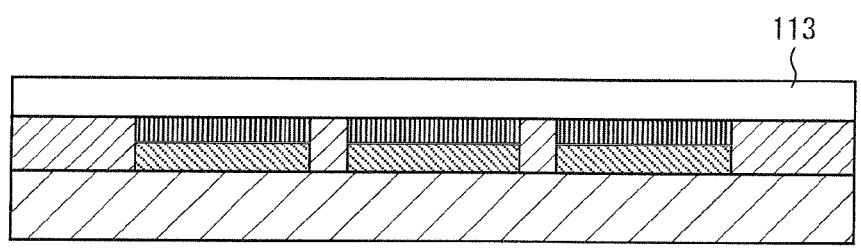

(a) of FIG. 10 is a cross sectional view showing how a reflection layer is patterned. (b) of FIG. 10 is a cross sectional view showing how a water-repellent resin is provided in a pattern formed in the reflection layer shown in (b) of FIG. 10. (c) of FIG. 10 is a cross sectional view showing how a polarizing layer is patterned on the reflection layer shown in (b) of FIG. 10. (d) of FIG. 10 is a cross sectional view showing how a protection layer is provided after the polarizing layer has been patterned as shown in (c) FIG. 10.

Figure 11:
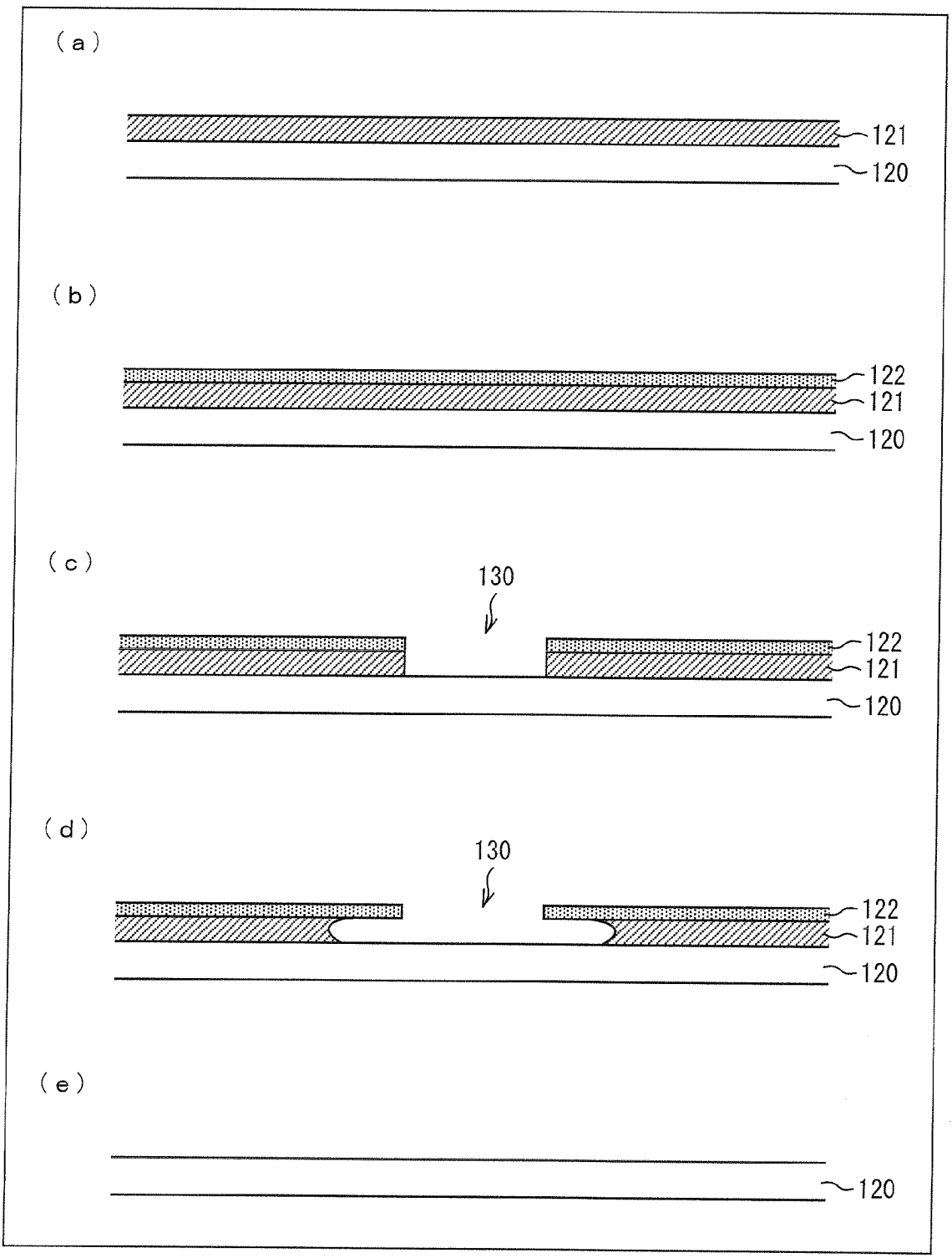

(a) of FIG. 11 is a cross sectional view showing how a water-soluble layer is provided on a substrate. (b) of FIG. 11 is a cross sectional view showing how a protection layer is provided after the water-soluble layer has been provided as shown in (a) of FIG. 11. (c) of FIG. 11 is a cross sectional view showing how a contact hole is provided after the protection layer has been provided as shown in (b) of FIG. 11. (d) of FIG. 11 is a cross sectional view showing how side surface of the water-soluble layer, which are side walls of the contact hole shown in (c) of FIG. 11, are etched. (e) of FIG. 11 is a cross sectional view showing how the water-soluble layer and the protection layer are removed from the configuration shown in (d) of FIG. 11.

DESCRIPTION OF EMBODIMENTS

One embodiment of the present invention is described below, with reference to FIGS. 1 through 9.

Figure 1:
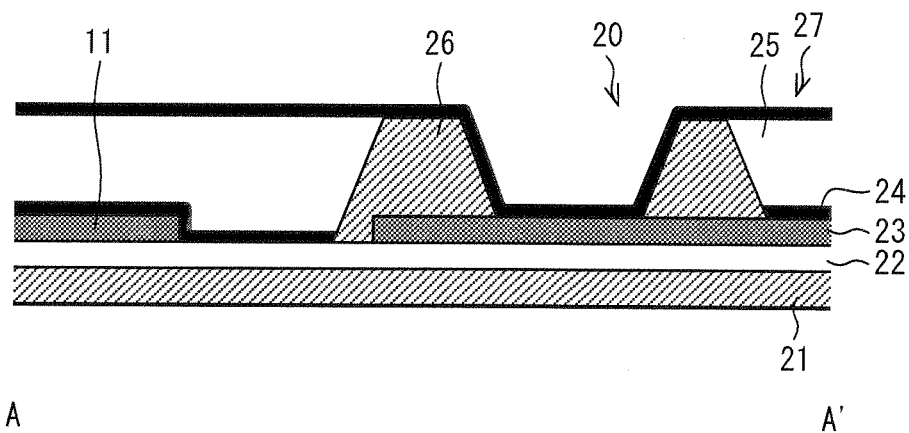
FIG. 1 is a cross sectional view taken on a line A-A of FIG. 2 and showing an electrode contact structure in accordance with one embodiment of the present invention.
Figure 2:
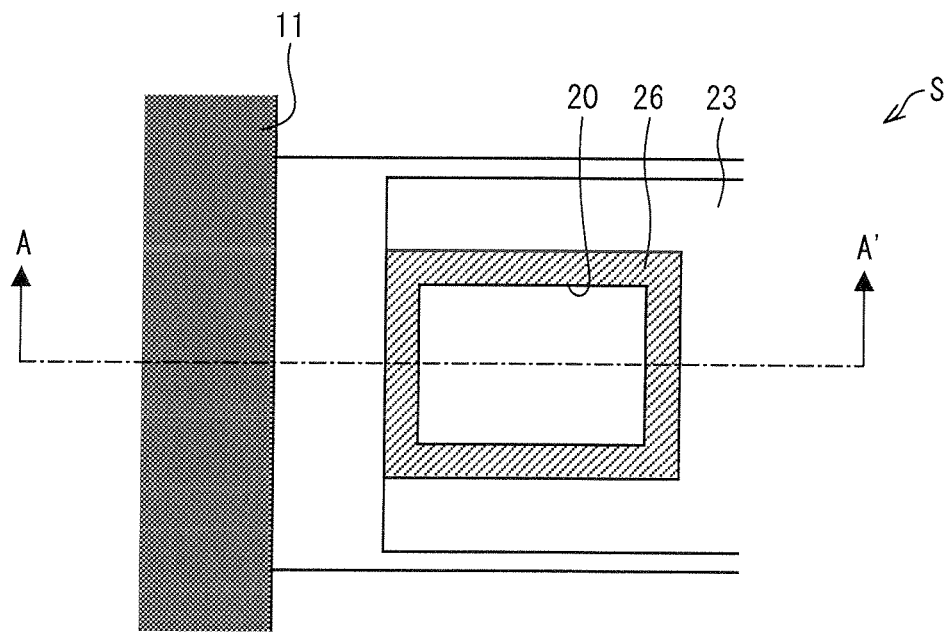
FIG. 2 is an enlarged view of an area around the electrode contact structure shown in FIG. 3.
Figure 3:
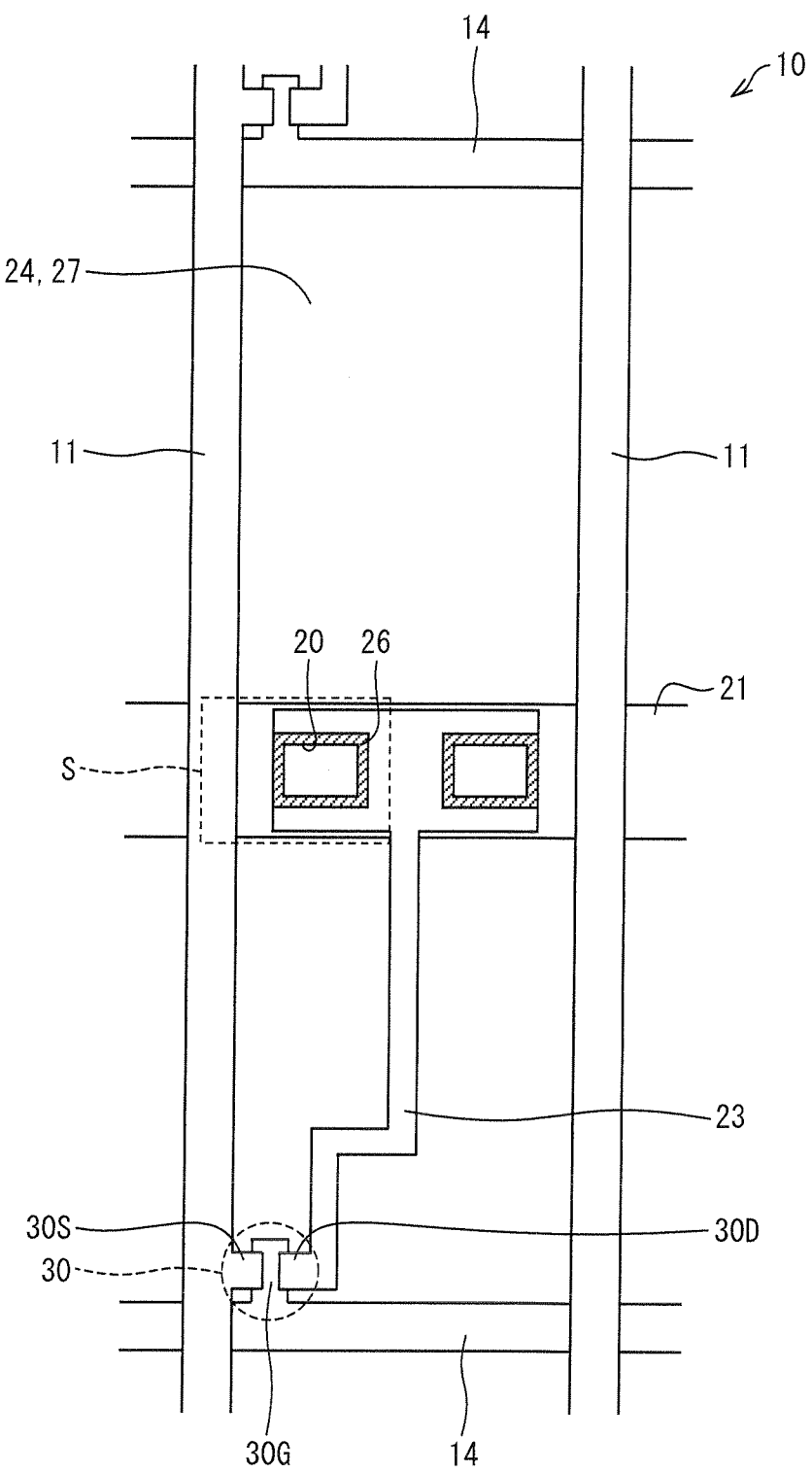
FIG. 3 is a plan view showing a pixel having the electrode contact structure, in accordance with the one embodiment of the present invention.

FIGS. 1 though 3 show respective electrode contact structures of the present embodiment. FIG. 3 is a plan view showing a pixel having an electrode contact structure of the present embodiment. FIG. 2 is a plan view showing how the electrode contact structure shown in FIG. 3 is configured. FIG. 1 is a cross sectional view taken on a line A-A' of FIG. 2.

FIG. 3 is a plan view showing a pixel 10. FIG. 3 shows how the pixel 10 is configured in a driving device substrate of a liquid crystal panel in which a driving device (TFT device) is provided for switching the pixel 10 between an on state and an off state. The liquid crystal panel includes the driving device substrate and a common substrate which faces the driving device substrate via a liquid crystal layer.

In the present embodiment, the liquid crystal panel is a transmissive liquid crystal panel that has a transmissive region where light coming from a backlight passes through so that an image and/or the like is displayed. However, the present embodiment is not limited to this. Instead, the liquid crystal panel can be a reflective liquid crystal panel that has a reflective region where external light is reflected so that an image and/or the like is displayed. Furthermore, the liquid crystal panel can alternatively be a transflective liquid crystal panel in which both a transmissive region and a reflective region are provided in each pixel.

(Summary of Configuration of Pixel)

As shown in FIG. 3, source lines 11 are provided in the pixel 10 so as to extend in parallel with each other, and gate lines 14 are provided in the pixel 10 so as to extend in such a direction that the source lines 11 and the gate lines 14 intersect with each other. The pixel 10 is specified by an area that is defined by the source lines 11 and the gate lines 14. A TFT device 30 (driving device) for switching the pixel 10 between an on state and an off state is provided near an intersection between the source line 11 and the gate line 14. The TFT device 30 has a source line 30S connected to the source line 11 and a gate line 30G connected to the gate line 14.

A CS bus line (storage capacitor line) 21 is provided near an approximate center of the pixel 10, so as to extend in parallel with the gate lines 14. In the pixel 10, a drain line 23 (first electrode) is provided so that its one end part is located above the CS bus line 21. The other end part of the drain line 23 is connected to a drain line 30D (first electrode) of the TFT device 30. A storage capacitor of the pixel 10 is defined by the one end part of the drain line 23 and the CS bus line 21.

The one part of the drain line 23 is of a rectangular shape, and has two contact holes 20. A water-repellent pattern 26, made from a water-repellent material, is provided around each of the two contact holes 20. Note that the number of contact holes 20 is not necessarily two (2). Instead, it can be one (1), for example.

A polarizing layer 24 (water-soluble layer, intermediate layer) is provided in a region of the pixel 10 other than the regions where the respective two contact holes 20 are provided. The polarizing layer 24 is made from a water-soluble material. An ITO layer 27 (second electrode) is provided above the polarizing layer 24. The ITO layer 27 serves as a pixel electrode. Note that a water-soluble material disclosed in the patent literature 2 can be used as the water-soluble material from which the polarizing layer 24 is made.

As later described, the ITO layer 27 and the drain line 23 are electrically connected to each other in regions where the respective two contact holes 20 are located. With reference to FIGS. 1 and 2, the following description discusses in detail how the regions having the respective two contact holes 20 are configured.

(Electrode Contact Structure)

FIG. 2 is a plan view showing a region S, which corresponds to a region shown by a dashed line in FIG. 3. FIG. 1 is a cross sectional view taken on the line A-A' of FIG. 2.

The CS bus line 21 is provided, for example, on a substrate (not shown) made from a material such as glass. A gate insulating film 22 made from an insulating material is provided on the CS bus line 21. The source lines 11 and the drain line 23 are juxtaposed on the gate insulating film 22. An intermediate layer is provided on the source lines 11 and the drain line 23. The intermediate layer is made up of (i) the polarizing layer 24 made from the water-soluble material and (ii) a protection layer stacked on the polarizing layer 24. In the present embodiment, an interlayer insulating film 25 (intermediate layer) is used as the protection layer. The interlayer insulating film 25 is a transparent resin, and can be subjected to alkali development.

In the present embodiment, an organic insulating film, which contains a resin such as an acrylic resin, an epoxy resin, a polyimide resin, a polyurethane resin, a novolac resin, or a siloxane resin, is used as the interlayer insulating film 25.

An opening is formed in a part of the polarizing layer 24 provided on the drain line 23 and in a corresponding part of the interlayer insulating film 25 stacked on the polarizing layer 24. The opening corresponds to the contact hole 20. The contact hole 20 is surrounded by the water-repellent pattern 26 made from the water-repellent material. As such, the water-repellent pattern 26 causes the contact hole 20 to be separated from the polarizing layer 24. Note that a light hardening resin made from a material such as a fluorinated acrylate material can be used as the water-repellent material. The ITO film 27 is provided on the interlayer insulating film 25. The ITO film 27 and the drain line 23 are electrically connected to each other within the contact hole 20.

According to the electrode contact structure of the present embodiment, the water-repellent pattern 26 provided around the contact hole 20 causes the contact hole 20 to be separated from the polarizing layer 24 of the intermediate layer 24. As such, during the patterning of the contact hole 20, the polarizing layer 24 made from the water-repellent material will never be exposed to a developing solution in a photolithography step. Therefore, even in a case where the contact hole 20 is subjected to the alkali development in a normal photolithography step, it is possible to prevent (i) an alkali solution used in the alkali development from percolating the polarizing layer 24 and (ii) the polarizing layer 24 from ultimately exfoliating due to the percolating.

TMAH, sodium carbonate, caustic soda, or the like can be used as the alkali developing solution used in the photolithography step.

Since the contact hole 20 can be prepared by use of the alkali development, it is further possible to prevent a reduction in mass productivity, as compared to a case in which the contact hole 20 is prepared by use of organic solvent development.

According to the pixel 10, the contact hole 20 can be thus patterned by use of the alkali development, even in a case where the intermediate layer is partially made up of the polarizing layer 24 which is made from the water-soluble material. It is therefore possible to provide an electrode contact structure which prevents a reduction in mass productivity, as compared to the case in which the contact hole 20 is prepared by use of the organic solvent development.

The water-repellent pattern 26 has an inner side surface which is an inner wall of the contact hole 20, the inner side surface of the water-repellent pattern 26 being so that the contact hole 20 has a taper shape in which an inner diameter of the contact hole 20 is increased from a bottom surface of the contact hole 20 to an opening of the contact hole 20.

In contrast, in a case where the contact hole 20 has a so-called "reversed taper shape" in which the inner wall of the water-repellent pattern 26 is at an angle of 90° or less with respect to the bottom surface of the contact hole 20, it is difficult to provide the ITO film 27 so as to cover the inner wall of the water-repellent pattern 26 and the bottom surface of the contact hole 20 continuously.

It is ensured that the ITO film 27 covers the inner wall of the water-repellent pattern 26 and the bottom surface of the contact hole 20 continuously, by causing the inner side surface of the water-repellent pattern 26 to have the taper shape. It is therefore possible to prevent the ITO film 27 from disconnecting in the contact hole 20. Note that the inner side surface of the water-repellent pattern 26 is preferably at an angle of 45°, but the present embodiment is not limited to this.

Note that the smaller area the water-repellent pattern 26 occupies, the more advantageous is brought about in terms of realization of a more minute electrode contact structure. In order to make smaller the area occupied by the water-repellent pattern 26, it is necessary that the inner side surface of the water-repellent pattern 26 be inclined at an angle closer to 90°.

Note, however, that such an angle closer to 90° causes an increase in risk that the ITO film 27 is disconnected in the contact hole 20.

In view of the circumstances, the inner side surface of the water-repellent pattern 26 is inclined at an angle of approximately 45°. This can optimize a trade-off relationship between a reduction in the area occupied by the water-repellent pattern 26 and the risk that the ITO film 27 is disconnected in the contact hole 20.

That is, the prevention of the ITO film 27 from being disconnected in the contact hole 20 is compatible with the minimization of the area occupied by the water-repellent pattern 26.

Note that a planar shape of the contact hole 20 is not limited to a quadrangle, but can be varied in accordance with a type of a liquid crystal panel which employs the pixel 10. As described above, it is preferable in terms of realization of a minute electrode contact structure that the contact hole 20 have a smaller size. Note, however, that a required size of the pixel 10 varies in accordance with a type of a liquid crystal panel which employs the pixel 10. As such, the contact hole 20 should be prepared to have the required size.

(Manufacturing Method 1)
(No Water-Repellent Pattern)

A method for forming a contact hole is described below.

First described with reference to (a) through (d) of FIG. 4 is a case in which no water-repellent pattern is provided around a contact hole.

(a) of FIG. 4 is a cross sectional view showing how a TFT device and an insulating film are patterned. (b) of FIG. 4 is a cross sectional view showing how a polarizing layer is deposited after the TFT device and the insulating film have been patterned as shown in (a) of FIG. 4. (c) of FIG. 4 is a cross sectional view showing how an interlayer insulating film is deposited so as to pattern a contact hole, after the polarizing layer has been deposited as shown in (b) of FIG. 4. (d) of FIG. 4 is a cross sectional view showing how an ITO layer is patterned after the interlayer insulating film has been deposited as shown in (c) of FIG. 4.

As shown in (a) of FIG. 4, a gate line 30G is deposited, by sputtering, on a substrate such as glass. Subsequently, a gate insulating film 22 (not shown) is deposited by a method such as the sputtering, so as to cover the gate line 30G. Then, a source line 30S and a drain line 30D are deposited, by sputtering, on respective sides of the gate line 30G so that (i) the source line 30S and the drain line 30D cover parts of the respective sides of the gate line 30G.

An insulating film 29 is deposited, by photolithography, on the source line 30S, the gate line 30G, and the drain line 30D (see (d) of FIG. 4). This causes an opening to be secured in the insulating film 29. The opening, which is in the insulating film 29 on the drain line 30D, is a region where a contact hole 20 is to be formed.

The polarizing layer 24, which has a water-soluble property and serves as an intermediate layer, is deposited, by a method such as a CVD (Chemical Vapor Deposition) or a spin coat method, so as to cover the insulating film 29 and the opening (see (b) of FIG. 4).

The interlayer insulating film 25, which serves as an intermediate layer, is deposited on the polarizing layer 24 by a method such as the CVD method or the spin coat method. The interlayer insulating film 25 is a protection layer. Then, the polarizing layer 24 and the interlayer insulating film 25 which are deposited in the opening, which is in the insulating film 29 on the drain line 30D and is the region where the contact hole is to be secured, are removed in a photolithography step employing alkali development. This secures a contact hole 100.

During the alkali development, however, a part of the polarizing layer 24 is directly exposed to an alkali developer. Since the polarizing layer 24 is made from the water-soluble material, the alkali developer reaches and percolates from the exposed part into an inner part of the polarizing layer 24 which is located around the contact hole 100. This causes inner part of the polarizing layer 24 to be also removed (etched). Similarly, a part of the insulating film 29 is exposed to the alkali developer. This causes a side surface of the insulating film 29, which is an inner wall of the contact hole 100, to be also etched so that the inner wall has a reversed taper shape as shown in (c) of FIG. 4.

Then, an ITO film 27 is patterned on the interlayer insulating film 25 (see (d) of FIG. 4). This cause the ITO film 27 and the drain line 30D to be in contact with each other within the contact hole 100. However, since the side surface of the insulating film 29 has the reversed taper shape, it is less likely that the ITO film 27 certainly covers the side surface of the insulating film 29. Therefore, it is more likely that the ITO film 27 is disconnected.

(Provision of Water-Repellent Pattern)

Next, the following description discusses how the water-repellent pattern is provided around a contact, with reference to (a) through (e) of FIG. 5.

(a) of FIG. 5 is a cross sectional view showing how a TFT device and an insulating film are patterned. (b) of FIG. 5 is a cross sectional view showing how a water-repellent pattern is patterned to be around a region where a contact hole is to be formed, after the TFT device and the insulating film have been patterned as shown in (a) of FIG. 5. (c) of FIG. 5 is a cross sectional view showing how a polarizing layer is deposited, after the water-repellent pattern around the region has been deposited as shown in (b) of FIG. 5. (d) of FIG. 5 is a cross sectional view showing how an interlayer insulating film is deposited so as to pattern a contact hole, after the polarizing layer has been deposited as shown in (c) of FIG. 5. (e) of FIG. 5 is a cross sectional view showing how an ITO film is patterned after the interlayer insulating film has been deposited as shown in (d) of FIG. 5.

A step of forming a TFT device (a step of forming a first electrode) is carried out in which, similarly to the process shown in (a) of FIG. 4, the gate line 30G and the gate insulating film 22 (not shown) are deposited, by sputtering, on a substrate made from glass or the like (see (a) of FIG. 5). The source line 30S and the drain line 30D are deposited by sputtering on the gate line 30G and the gate insulating film 22. By a series of the processes, the TFT device 30 is formed.

After the step of forming a TFT device, a step of patterning an insulating film is carried out in which the insulating film 29 is provided above the TFT device 30 by a CVD method or the like. Then, the insulating film 29 is patterned by photolithography in a similar way to the process shown in (a) of FIG. 4, so as to have an opening in a region which is located above the drain line 30D and where a contact hole is to be formed.

After the step of forming the insulating film 29, a step of forming a water-repellent pattern is carried out. In the step of forming the water-repellent pattern, the water-repellent pattern 26 is patterned around the opening in the insulating film 29 by the photolithography (see (b) of FIG. 5).

The water-repellent pattern 26 is formed by carrying out a mask pattern exposure and an alkali development with respect to a fluorinated acrylate material.

In the present embodiment, the water-repellent pattern 26 has a thickness of approximately 0.1 μm to 1 μm and a width of 2 μm to 5 μm, and a side of the opening is approximately 2 μm to 5 μm. The size of the opening is identical to that of the contact hole 20.

It is preferable in the step of forming the water-repellent pattern that the positioning of the water-repellent pattern 26 be carried out so that the water-repellent pattern 26 is formed in contact with an exposed part of the drain line 30D which is exposed in a bottom of the contact hole 20. In other words, it is preferable that the positioning of the water-repellent pattern 26 be carried out so that the water-repellent pattern 26 is formed to cover sides of the insulating film 29 on the opening side. Furthermore, it is preferable that the water-repellent pattern 26 be patterned so that its inner wall of the opening has a taper shape.

After the step of forming a water-repellent pattern, a step of depositing a polarizing layer (a step of forming an intermediate layer) is carried out in which, as shown in (c) of FIG. 5, the polarizing layer 24 is formed by a method such as, for example, a CVD method or a spin coat method. In the present embodiment, the polarizing layer 24 has a thickness of 0.1 μm to 0.5 μm. The polarizing layer 24 is made from the water-soluble material, whereas the water-repellent pattern 26 is made from the water-repellent material. As such, no polarizing layer 24 is formed on the water-repellent pattern 26. On the other hand, since no water-repellent process is carried out with respect to the bottom of the opening which is surrounded by the water-repellent pattern 26, the polarizing layer 24 is formed on the bottom of the opening. The polarizing layer 24 is thus selectively formed in the step of depositing the polarizing layer.

That is, in the step of depositing a polarizing layer, the polarizing layer 24 is deposited on the region other than the region, inclusive of the region in the opening, where the water-repellent pattern 26 has been formed.

After the step of depositing a polarizing layer, the step of depositing a protection layer (the step of depositing an intermediate layer) is carried. In the step of depositing the protection layer, as shown in (d) of FIG. 5, a protection layer developable by the alkali development is deposited on an entire surface of the water-repellent pattern 26. According to the present embodiment, an interlayer insulating film made from a transparent resin material is deposited, as the interlayer insulating film 25, on the polarizing layer 24 by the method such as the CDV method or the spin coat method. In the present embodiment, the interlayer insulating film 25 has a thickness of 1 μm to 2 μm. Note, however, that the protection layer is not limited to the interlayer insulating film 25. Instead, any layer, made from a currently employed transparent resin which can be developed by the alkali development, can be used as the protection layer. Examples of the transparent resin which can be developed by alkali development encompass an alicyclic epoxy resin, a modified alicyclic epoxy resin, an aliphatic epoxy resin, a bisphenol A-type epoxy resin, a bisphenol F-type epoxy resin, a hydrogenated bisphenol A-type epoxy resin, a cresol novolac-type epoxy resin, and the like.

The common substrate includes the color filter. However, the present embodiment is not limited to this. Instead, the intermediate layer of the driving device substrate can include the color filter (later described in detail).

After the step of depositing the protection layer, the step of forming the contact hole (the step of removing the intermediate layer) is carried out. In the step of removing the intermediate layer, the interlayer insulating film 25 and the polarizing layer 24, which are formed inside the region (the opening) surrounded by the water-repellent pattern 26, are removed by the photolithography employing the mask exposure and the alkali development.

Specifically, the mask exposure and the alkali development are carried out, in sequence with, respect to the interlayer insulating film 25 in the region (the opening) surrounded by the water-repellent pattern 26. This causes removals of respective of (i) the interlayer insulating film 25 thus exposed and (ii) the polarizing layer 24 which is located under the interlayer insulating film 25 and is made from the water-soluble material. Note that no mask exposure is carried out with respect to a region (non mask-exposed region) outside the region which is surrounded by the water-repellent pattern 26. As such, even if the alkali development is carried out with respect to such a region, neither the interlayer insulating film 25 nor the polarizing layer 24 is removed.

The contact hole 20 is thus formed inside the region (opening) surrounded by the water-repellent pattern 26. That is, the water-repellent pattern 26 causes the contact hole 20 to be separated from the polarizing layer 24. This prevents the polarizing layer 24 from being exposed to the alkali developer, and therefore prevents the alkali developer from leaking outside the contact hole 20. It follows that the polarizing layer 24 made from the water-soluble material is protected from the alkali developer.

Furthermore, in a case where the water-repellent pattern 26 covers the sides of the insulating film 29 on the contact hole 20 side, the water-repellent pattern 26 causes the insulating film 29 to be separated from the contact hole 20. As such, the insulating film 29 will never be exposed to the alkali developer. It is therefore possible to prevent the insulating film 29 from being etched by the alkali development which is carried out during the forming of the contact hole 20. It follows that it is possible to prevent the insulating film 29 from having the reversed taper shape as shown in (c) of FIG. 4.

After the step of forming a contact hole, the step of forming a pixel electrode (the step of forming a second electrode) is carried out. In the step of forming a pixel electrode, as shown in (e) of FIG. 5, an ITO film 27 is patterned on the interlayer insulating film 25 by sputtering. The ITO film 27 patterned as such is formed also inside the contact hole 20, and electrically connected to the drain line 30D. By a series of the processes, it is possible to manufacture a desired contact structure.

An inner side surface of the water-repellent pattern 26 is an inner wall of the contact hole 20 that has the taper shape. This allows the ITO film 27 to certainly cover the inner side surface of the water-repellent pattern 26. It is therefore possible to prevent the ITO film 27 from being disconnected.

In the series of the processes shown in (a) through (e) of FIG. 5, there is formed in advance a region inside the contact hole 20 where no water-repellent pattern 26 is provided. As such, in the region inside the contact hole 20, the polarizing layer 24 is temporarily provided. However, the polarizing layer 24 is later removed, together with a corresponding part of the interlayer insulating film 25, by the alkali development. It is therefore possible to manufacture a desired contact structure.

It is therefore possible to constitute a TFT substrate including an electrode contact structure of the present embodiment.

The TFT substrate configured as such further has an alignment film formed thereon. The TFT substrate and the common substrate are combined to each other, and liquid crystal is poured in between them. This constitutes a liquid crystal display apparatus (liquid crystal display panel). It is therefore possible to manufacture a liquid crystal display apparatus including the liquid crystal display device.

(Manufacturing Method 2)

It is preferable that a drain line 30D have its end in a contact hole 20, in order to prevent with certainty the ITO film 27 from being disconnected in the contact hole 20.

This is discussed with reference to (a) through (d) of FIG. 6 and (a) through (e) of FIG. 7.

At first, with reference to (a) through (d) of FIG. 6, the following description discusses it as to a case in which (i) no water-repellent pattern around a contact hole is provided, and (ii) a drain electrode has its line end located outside the contact hole. Then, with reference to (a) through (d) of FIG. 7, the following description discusses the same as to a case in which (i) a water-repellent pattern around a contact hole is provided, and (ii) a drain electrode has its line end located in the contact hole.

(a) through (d) of FIG. 6 are views showing a method for securing a conventional inter-electrode contact.

(a) of FIG. 6 is a cross sectional view showing how a TFT device and an insulating film are patterned. (b) of FIG. 6 is a cross sectional view showing how a polarizing layer is deposited after the TFT device and the insulating film have been patterned as shown in (a) of FIG. 6. (c) of FIG. 6 is a cross sectional view showing how an interlayer insulating film is deposited so as to pattern a contact hole, after the polarizing layer has been deposited as shown in (b) of FIG. 6. (d) of FIG. 6 is a cross sectional view showing how an ITO film is patterned after the interlayer insulating film has been deposited as shown in (c) of FIG. 6.

(a) through (e) of FIG. 7 are views showing a manufacturing method as to the case in which (i) the water-repellent pattern around the contact hole is formed, and (ii) the drain electrode has its end located in the contact hole.

(a) of FIG. 7 is a cross sectional view showing how a TFT device and an insulating film are patterned. (b) of FIG. 7 is a cross sectional view showing how a water-repellent pattern is provided around to a region where the contact hole is to be formed, after the TFT device and the insulating film have been deposited as shown in (a) of FIG. 7. (c) of FIG. 7 is a cross sectional view showing how a polarizing film is formed after the water-repellent pattern around the region is provided as shown in (b) of FIG. 7. (d) of FIG. 7 is a cross sectional view showing how an interlayer insulating film is deposited so as to patter a contact hole, after the polarizing film has been deposited as shown in (c) of FIG. 7. (e) of FIG. 7 is a cross sectional view showing how an ITO film is deposited after the interlayer insulating film has been deposited as shown in (d) of FIG. 7.

At first, as shown in (a) of FIG. 6, a TFT device 30 is patterned in a same way as shown in (a) of FIG. 4. Then, an interlayer insulating film 29 is patterned in a same way as shown in (a) of FIG. 4, so as to have an opening in a region which is located above a drain line 30D and where a contact hole is to be formed. Subsequently, as shown in (b) of FIG. 6, a polarizing layer 24 is deposited above the insulating film 29 in a same way as shown in (b) of FIG. 4.

Then, as shown in (c) of FIG. 6, an interlayer insulating film 25 is provided on the polarizing layer 24 in a same way as shown in (c) of FIG. 4. Subsequently, as shown in (c) of FIG. 6, respective parts of the polarizing layer 24 and the interlayer insulating film 25 which are provided in the opening are removed, in a same way as shown in (c) of FIG. 4, by photolithography employing alkali development. By a series of the processes, a contact hole 101 is formed.

In this case, however, there occurs a same problem as described earlier that, in the contact hole 101, not only (i) a side surface of the insulating film 29 which is an inner wall of the contact hole 101 but also (ii) the drain line 30D are exposed to an alkali developer. This may cause that part of the drain line 30D, which is around a part of the contact line 30D which is the bottom surface of the contact hole 101, to be etched. This further causes the inner side wall of the contact hole 101 to have the reversed taper shape.

In this case, as shown in (d) of FIG. 6, if an ITO film 27 is patterned, it is more likely that the ITO film 27 is disconnected at the inner side wall of the contact hole 101.

Next, the following description discusses the manufacturing method as to a case in which (i) a water-repellent pattern around a contact hole is provided, and (ii) a drain electrode has its end located in the contact hole.

As shown in (a) of FIG. 7, a step of forming a TFT device is carried out. The step of forming a TFT device is same as the corresponding step described earlier, and in the step of forming a TFT device, a TFT device 30 is patterned in a same way as shown in (a) of FIG. 5. After the step of forming a TFT device, a step of patterning an insulating film is carried out. The step of patterning an insulating film is same as the corresponding step described earlier, and in the step of patterning an insulating, an insulating film 29 is patterned so as to have an opening in a region where the contact hole is to be formed. Note that positioning of the opening is carried out so that the drain line 30D has its end located in the opening. This causes a substrate, which is located under the drain line 30D and made from glass, to be exposed at a bottom of a contact hole.

After the step of patterning an insulating film, a step of providing a water-repellent pattern is carried out. In the step of providing a water-repellent pattern, as shown in (b) of FIG. 7, a water-repellent pattern 26 is patterned around the opening by photolithography. The water-repellent pattern 26 has a part in contact with the drain line 30D and another part in contact with the glass provided under the drain line 30D.

After the step of providing a water-repellent pattern, a step of depositing a polarizing film is carried out. In the step of depositing a polarizing film, as shown in (c) of FIG. 7, a polarizing layer 24 is deposited by, for example, a CDV method or a spin coat method. After the step of depositing a polarizing film, a step of depositing a protection layer is carried out. In the step of depositing a protection layer, as shown in (d) of FIG. 7, an interlayer insulating film 25 is deposited on the polarizing layer 24 by, for example, the CVD method or the spin coat method. After the step of depositing a protection layer, a step of forming a contact hole is carried out. In the step of forming the contact hole, respective parts of the polarizing layer 24 and the interlayer insulating film 25, which are provided in the region where the contact hole is to be formed, are removed by the photolithography employing the alkali development. This causes a contact hole 31 to be formed.

In this case, however, there arises a same problem as described earlier that, in the contact hole 31, the drain line 30D is exposed to an alkali developer. This may causes a contact part of the drain line 30D, at which the drain line 30D is connected to an inner side surface of the water-repellent pattern 26 which is an inner wall of the contact hole 31, to be etched to have a reversed taper shape. On the other hand, since glass is hardly etched by alkali development, it is possible to prevent a contact part of the glass located under the drain line 30D, at which contact part the glass is in contact with the water-repellent pattern 26, from having a reversed taper shape.

After the step of depositing the polarization film, a step of forming a pixel electrode is carried out. In the step of forming the pixel electrode, as shown in (e) of FIG. 7, an ITO film 27 is patterned by a method such as sputtering. In this case, however, there is case that the contact part of the drain line 30D has the reversed taper shape. Thus, the ITO film 27 is disconnected in some cases. On the other hand, the contact part of the glass has no such reversed taper shape. Thus, it is possible to prevent the ITO film 27 from being disconnected. It is therefore possible that the ITO film 27 and the drain line 30D be electrically connected to each other with higher certainty.

By a series of the processes, a TFT substrate is prepared. Subsequently, an alignment film is deposited on the TFT substrate. The TFT substrate is combined to a common substrate, and liquid crystals are poured in between them. This constitutes a liquid crystal display device (liquid crystal panel). It is therefore possible to manufacture a liquid crystal display apparatus including the liquid crystal display device.

(Liquid Crystal Display Apparatus)

The following description discusses a liquid crystal display apparatus in which an electrode contact structure of the present embodiment is employed. The following description discusses, as one example, a liquid crystal display apparatus manufactured by the processes shown in FIG. 5, with reference to FIG. 8.

FIG. 8 is a cross sectional view schematically showing a liquid crystal display apparatus in which an electrode contact structure of the present embodiment is employed.

As shown in FIG. 8, a liquid crystal panel 70 of the present embodiment is made up of (i) a TFT substrate 40 in which a TFT device 30 is provided, (ii) a liquid crystal layer 62, and (iii) a common substrate 50 that faces the TFT substrate 40 via the liquid crystal layer 62. On respective surfaces of the TFT substrate 40 and the common substrate 50, which are opposing surfaces to surfaces facing each other via the liquid crystal layer 62, a polarizing plate 60 (first polarizing plate) and a polarizing plate 61 (second polarizing plate) are provided. Both the polarizing plates 60 and 61 primarily have an iodine component.

The TFT substrate 40 is such that the TFT device 30, the insulating film 29, the polarizing layer 24, the interlayer insulating film 25, the ITO film 27, the contact hole 20, and the water-repellent pattern 26 are deposited, on the glass substrate 41, in this order from an outer surface of the common substrate 50 (an opposing surface to a surface facing the TFT substrate 40) to an inner surface of the common substrate 50 (the surface facing the TFT substrate 40), as described above. Additionally, the alignment film 42 is provided on the ITO film 27.

The common substrate 50 is such that a glass substrate 51, a color filter (CF) 52, a polarizing layer 53 (another polarizing layer), an ITO film 54, and an alignment film 55 are deposited in this order from an outer surface (an opposing surface to a surface facing the TFT substrate 40) to an inner surface (the surface facing the TFT substrate 40).

The polarizing layer 53 can be made from a same material from which the polarizing layer 24 is made. A currently employed color filter can be used as the color filter 52, and a currently employed alignment film can be used as the alignment film 55.

Note that a backlight (not shown) is provided to the outer surface of the TFT substrate 40 (opposing surface to the surface facing the common substrate 50).

The liquid crystal panel 70 made up of the TFT substrate 40 and the common substrate 50 configured as such includes four (4) polarizing plates, which are: a polarizing plate 60 and a polarizing layer 24 each for passing through linearly polarized light that is linearly polarized in a direction parallel with directions of the liquid crystal panel 70 and a sheet of paper on which FIG. 8 is drawn; and a polarizing layer 53 and a polarizing plate 61 each for passing through linearly polarized light that is linearly polarized in a direction which is parallel with a direction of the liquid crystal panel 70 but orthogonal to the sheet of paper on which FIG. 8 is drawn.

The polarizing plate 60 and the polarizing layer 24 have their transmission axes in a direction parallel with the directions of the liquid crystal panel 70 and the sheet of paper on which FIG. 8 is drawn. The polarizing layer 53 and the polarizing plate 61 have their transmission axes in a direction parallel with the direction of the liquid crystal display panel 70 but orthogonal to the direction of the sheet on which FIG. 8 is drawn.

It follows that the directions of the respective transmission axes of the polarizing plate 60 and the polarizing layer 24 extend in perpendicular to the directions of the respective transmission axes of the polarizing layer 53 and the polarizing plate 61. The direction of the transmission axis of the polarizing plate 60 extends in a same direction as that of the transmission axis of the polarizing layer 24. The direction of the transmission axis of the polarizing layer 53 extends in a same direction as that of the transmission axis of the polarizing plate 61.

Note that it is satisfactory if the directions of the respective transmission axes of the polarizing plate 60 and the polarizing layer 24 extend in perpendicular to the directions of the respective transmission axes of the polarizing layer 53 and the polarizing plate 61. However, one of (i) the directions of the respective transmission axes of the polarizing plate 60 and the polarizing layer 24 and (ii) the directions of the respective transmission axes of the polarizing layer 53 and the polarizing plate 61 has to extend in parallel with the direction of the sheet of paper on which FIG. 8 is drawn, whereas the other one of (i) and (ii) has to extends in perpendicular to the direction of the sheet of paper.

That is, the directions of the respective transmission axes of the polarizing plate 60 and the polarizing layer 24 can extend in parallel with the direction of the liquid crystal panel 70 but in perpendicular to the direction of the sheet of paper on which FIG. 8 is drawn, whereas the directions of the respective transmission axes of the polarizing layer 53 and the polarizing plate 61 can extend in parallel with directions of the liquid crystal panel 70 and the sheet of paper on which FIG. 8 is drawn.

The following description discusses a function of the liquid crystal panel as to a case where pixels are driven so as to carry out dark display (off display). In this case, the polarizing plate 60 receives light coming from the backlight and passes through only linearly polarized light that is linearly polarized in a direction parallel with the direction of the sheet of paper on which FIG. 8 is drawn. Then, the linearly polarized light is incident on and blocked by the polarizing plate 61, which allows only passage of linearly polarized light that is linearly polarized in a direction perpendicular to the direction of the sheet of paper. Note, however, that the linearly polarized light, which is linearly polarized in the direction parallel with the direction of the sheet of paper and passes through the polarizing plate 60, is deteriorated in its polarization direction (i.e., depolarized) as it passes through the TFT substrate 40 and the common substrate 50 after passing through the polarizing plate 60. Consequently, light incident on the polarizing plate 61 has a light component that is polarized in a direction parallel with the direction of the transmission axis of the polarizing plate 61. As such, the light component passes through the polarizing plate 61, and this causes a reduction in contrast.

The present embodiment deals with this problem by providing the polarizing layer 24 as an in-panel polarizing layer in the liquid crystal panel 70. Specifically, with the polarizing layer 24, it is possible to correct the depolarization of the linearly polarized light having passed through the TFT 40.

By providing the polarizing layer 24, it is therefore possible to deal with an case in which the linearly polarized light, which is linearly polarized in the direction parallel with the direction of the sheet of paper and has passed through the polarizing plate 60, is incident on a member such as the TFT device 30 which causes depolarization of polarized light incident thereon. Specifically, even in that case, it is still possible to make sure that light incident on the polarizing plate 61 is linearly polarized in the direction parallel with the direction of the sheet of paper.

Moreover, by further providing the polarizing layer 53, it is possible to correct depolarization of the linearly polarized light that is depolarized as it passes through the common substrate 50.

This is described as follows. The polarizing layer 53 thus provided receives the linearly polarized light which is linearly polarized in the direction parallel with the direction of the sheet of paper and thus has passed through the polarizing layer 60. This can minimize an amount of light that would be otherwise incident on the color filter 52, which is a member causing depolarization, after passing through the liquid crystal layer 62. That is, most of the linearly polarized light, which is linearly polarized in the direction parallel with the direction of the sheet of paper and thus has passed through the polarizing layer 24, is blocked by the polarizing layer 53 before it is incident on the color filter 52.

It is therefore possible that, in a case where pixels are driven so as to carry out dark display, light passing through the polarizing plate 61 be prevented. This brings about an effect of preventing a decrease of contrast.

By employing the measures discussed so far, it is possible to constitute a liquid crystal display panel that (i) includes an in-panel polarizing layer and (ii) has a contact hole 20, which is an opening for electrically connecting a pixel electrode and a drain electrode and which can be subjected to the patterning by alkali development.

Furthermore, the liquid crystal panel 70 can be modified so as to include three (3) polarizing plates, by removing one of the polarizing layers 24 and 53. The liquid crystal panel 70 including four (4) polarizing plates has a drawback described as follows. Since the polarizing layers 24 and 53 are provided as in-pixel polarizing plates, contrast is improved. However, this also causes a reduction in light transmittance (white luminance), as compared to light transmittance in the liquid crystal panel which includes neither the polarizing plates 24 nor 53.

On the other hand, a liquid crystal panel including three (3) polarizing plates can deal with this drawback. In such liquid crystal panel, improvement in contrast is compatible with prevention of a reduction in transmittance.

In the liquid crystal panel 70 shown in FIG. 8, the color filter is provided in the common substrate. Note, however, that the color filter can be alternatively provided in the TFT device substrate.

This is described with reference to FIG. 9.

FIG. 9 is a cross sectional view schematically showing a configuration of a liquid crystal panel 80 in accordance with the present embodiment.

As shown in FIG. 9, the liquid crystal panel 80 includes a TFT substrate 46, a common substrate 56, and a liquid crystal layer 62 provided therebetween. On outer surfaces of respective of the TFT substrate 46 and the common substrate 56, which are opposing surfaces of surfaces facing each other via the liquid crystal layer 62, polarizing plates 60 and 61 are provided.

The TFT substrate 46 is different from the TFT substrate 40 in terms that a color filter 47 (intermediate layer) is provided on a lower surface of the polarizing layer 24. The common substrate 56 is different from the common substrate 50 in terms that neither a color filter 52 nor a polarizing layer 53 is provided. A configuration other than those aspects is identical. Thus, same members are given with same reference numerals, and explanations thereof are omitted.

A step of providing a water-repellent pattern, which is same as the corresponding step described earlier, is carried out. After this, a step of providing a color filter layer (a step of providing an intermediate layer) is carried in which the color filter 47 is patterned. The color filter 47 is patterned on the insulating film 29 by photolithography, so as to have an opening in a region where a contact hole is to be formed. Subsequently to this, a step of providing a polarizing layer 24, which is same as the corresponding step described earlier, is carried out. In the step of providing the polarizing layer, a polarizing layer 24 is provided. Subsequent steps to be carried out thereafter are same as the respective corresponding steps described earlier.

The TFT substrate 46 and the common substrate 56 configured as such are combined to each other, and liquid crystals are poured in between them. This constitutes the liquid crystal panel 80.

The liquid crystal panel 80 configured as such has a structure (CF on TFT array structure) in which the color filter is provided in the TFT device substrate.

In the liquid crystal panel 80, the polarizing plate 60 receives light coming from an outside of the TFT substrate 46 (an opposing side to a side on which the TFT substrate faces the common substrate 56) and passes through polarized light. The polarized light having passed through the polarizing plate 60 passes through the color filter 47 and the polarizing layer 24 in this order. Therefore, even if the polarized light is depolarized as it passes through the color filter 47, the polarizing layer 24 corrects the depolarization of the polarized light so that output light is polarized in a same direction as a direction of a transmission axis of the polarizing plate 60.

As described above, the liquid crystal panel 80 is configured in form of the CF on TFT array structure, and employs the three (3) polarizing plates structure in which the polarizing layer 24 is provided above the color filter 47, whereas the polarizing layers 60 and 61 are provided on the respective outer surfaces of the TFT substrate 46 and the common substrate 56. In the liquid crystal panel 80 configured as such, the polarizing layer 24 formed in pixels can carry out correction of depolarization of transmission light with respect to both the TFT substrate 46 and the common substrate 56. In the liquid crystal panel 80, additionally, it is possible to prevent a reduction in transmittance, which is a problem specific to a liquid crystal panel employing a four (4) polarizing plates structure. The liquid crystal display panel 80 can therefore realize high contrast at same time with preventing a problem concerning a reduction(s) in mass productivity and/or transmittance.

In the present embodiment, the water-soluble layer, which is included in the intermediate layer and made from the water-soluble material, is the polarizing layer. However, the water-soluble layer is not limited to the polarizing layer. That is, the water-soluble layer can be any of layers that are made from water-soluble materials and have respective different functions. For example, a wave plate that is made from a transparent material and has birefringence can be included in a liquid crystal panel, in place of the polarizing layer of the present embodiment. The liquid crystal display panel configured as such can incorporate a function of a viewing-angle compensating layer.

Usable examples of the wave plate made from a water-soluble material encompass a monoaxial wave plate (Negative A-plate [product name], Negative C-plate [product name]) and a biaxial wave plate (Biaxial BA-plate [product name]) manufactured by CRYSOPTIX KK.

The present invention is not limited to the configuration examples of the embodiment above, but may be altered by a skilled person within the scope of the claims. An embodiment based on a proper combination of technical means altered as appropriate within the scope of the claims is encompassed in the technical scope of the present invention.

INDUSTRIAL APPLICABILITY

In an electrode contact structure of the present invention, a water-repellent pattern is provided around a contact hole via which two electrodes are electrically connected to each other, one of which is an electrode that is provided below an intermediate layer including a layer made from a water-soluble material, and the other of which is an electrode that is provided above the intermediate layer. The electrode contact structure of the present invention is therefore widely usable as an electrode contact structure in a pixel of a liquid crystal display apparatus and as an electrode contact structure in which an opening is patternable by alkali development.

REFERENCE SIGNS LIST 10. pixel
20. contact hole
23. drain electrode (first electrode)
24. polarizing layer (intermediate layer, water-soluble layer)
25. interlayer insulating film (intermediate layer)
26. water-repellent pattern
27. ITO film (second electrode)
29. insulating film
30. TFT device
30D. drain electrode (first electrode)
30G. gate electrode
30S. source electrode
31. contact hole
40, 46. TFT substrate (driving device substrate)
47. color filter (intermediate layer)
50, 56. common substrate
52. color filter
53. polarizing layer (another polarizing layer)
60. polarizing plate (first polarizing plate)
61. polarizing plate (second polarizing plate)
70, 80. liquid crystal panel

The invention claimed is:

1. An electrode contact structure, comprising:
a first electrode that is provided above a substrate;
an intermediate layer that is provided above the first electrode and that includes a water-soluble layer made from a water-soluble material;
a second electrode that is provided on the intermediate layer and that is connected to the first electrode via a contact hole in the intermediate layer; and
a water-repellent pattern, made from a water-repellent material, which is provided around the contact hole so that the contact hole is separated from the water-soluble layer.

2. The electrode contact structure as set forth in claim 1, wherein:
the water-repellent pattern has an inner side surface which is an inner wall of the contact hole, the inner side surface of the water-repellent pattern being so that the contact hole has a taper shape in which an inner diameter of the contact hole is increased from a bottom surface of the contact hole to an opening of the contact hole.

3. The electrode contact structure as set forth in claim 2, wherein:
the inner side surface is at an angle of approximately 45° with the first electrode.

4. The electrode contact structure as set forth in claim 1, wherein:
the water-repellent pattern is provided so as to be in contact with the first electrode.

5. The electrode contact structure as set forth in claim 1, wherein:
the first electrode has its end in the contact hole.

6. A liquid crystal display apparatus, comprising:
an electrode contact structure recited in claim 1;
a driving device for carrying out a drive control with respect to a pixel, and
a pixel electrode via which a voltage is applied so that the pixel is driven,
the first electrode being a drain electrode of the driving device, and the second electrode being the pixel electrode.

7. The liquid crystal display apparatus as set forth in claim 6, further comprising:
a driving device substrate in which the driving device is provided in the pixel;
a common substrate that faces the driving device substrate;
a first polarizing plate that is provided on an outer side of the driving device substrate and that passes through light polarized in a first direction; and
a second polarizing plate that is provided on an outer side of the common substrate and that passes through light polarized in a second direction perpendicular to the first direction,
the water-soluble layer being a polarizing layer, and the polarizing layer and the polarizing plate having their respective transmission axes extending in substantially identical directions.

8. The liquid crystal display apparatus as set forth in claim 7, wherein
the common substrate includes:
a color filter that is provided so as to face the driving device substrate; and
another polarizing layer that is provided so as to face and be closer to the driving device substrate than the color filter is, the another polarizing layer and the second polarizing plate having their respective transmission axes extending in substantially identical directions.

9. The liquid crystal display apparatus as set forth in claim 6, wherein:
the water-soluble layer is a wave plate which causes a change in phase of light which passes through the wave plate.

10. The liquid crystal display apparatus as set forth in claim 7, wherein:
- the intermediate layer of the driving device substrate includes a color filter and the polarizing layer which are stacked in this order;
- the polarizing layer and the first polarizing plate have their respective transmission axes in substantially identical directions.

11. A method for manufacturing an electrode contact structure, comprising the steps of:
- (a) forming a first electrode above a substrate;
- (b) forming a water-repellent pattern around a region of the first electrode in which a contact hole is to be formed, the water-repellent pattern being made from a water-repellent material;
- (c) forming an intermediate layer above the first electrode formed above the substrate, the intermediate layer including a water-soluble layer that is made from a water-soluble material;
- (d) removing part of the intermediate layer which is formed in the region in which the contact hole is to be formed; and
- (e) forming a second electrode that is connected to the first electrode via the contact hole.

12. The method as set forth in claim 11, wherein;
the step (d) includes an alkali development step.

* * * * *